(12) United States Patent
Yang (10) Patent No.: US 11,397,522 B2
(45) Date of Patent: Jul. 26, 2022

(54) PAGE BROWSING

(71) Applicant: BEIJING SANKUAI ONLINE TECHNOLOGY CO., LTD., Beijing (CN)

(72) Inventor: Lin Yang, Beijing (CN)

(73) Assignee: BEIJING SANKUAI ONLINE TECHNOLOGY CO., LTD., Beijing (CN)

( * ) Notice: Subject to any disclaimer, the term of this patent is extended or adjusted under 35 U.S.C. 154(b) by 42 days.

(21) Appl. No.: 16/714,034

(22) Filed: Dec. 13, 2019

(65) Prior Publication Data
US 2020/0192537 A1 Jun. 18, 2020

Related U.S. Application Data

(63) Continuation of application No. PCT/CN2017/119461, filed on Dec. 28, 2017.

(30) Foreign Application Priority Data

Sep. 27, 2017 (CN) .......................... 201710889357.3

(51) Int. Cl.
*G06F 3/0485* (2022.01)
*G06F 3/0488* (2022.01)
(Continued)

(52) U.S. Cl.
CPC .......... *G06F 3/0485* (2013.01); *G06F 3/0481* (2013.01); *G06F 3/0482* (2013.01);
(Continued)

(58) Field of Classification Search
CPC ................ G06F 3/0485; G06F 3/0488; G06F 2203/04808; G06F 3/04883; G06F 3/0482;
(Continued)

(56) References Cited

U.S. PATENT DOCUMENTS 6,496,803 B1* 12/2002 Seet ...................... G06F 3/0483
705/14.73
8,375,336 B2* 2/2013 Matthews ............. G06F 3/0488
715/863
(Continued)

FOREIGN PATENT DOCUMENTS

CN 102508573 A 6/2012
CN 102508592 A 6/2012
(Continued)

OTHER PUBLICATIONS

T. Kwon, S. Na and S. Shin, "Touch pointer: rethink point-and-click for accurate indirect touch interactions on small touchscreens," in IEEE Transactions on Consumer Electronics, vol. 60, No. 3, pp. 285-293, Aug. 2014, doi: 10.1109/TCE.2014.6937310. (Year: 2014).*
(Continued)

*Primary Examiner* — Tuyetlien T Tran
(74) *Attorney, Agent, or Firm* — Nath, Goldberg & Meyer; Joshua B. Goldberg (57) ABSTRACT

The present disclosure provides a page browsing method and apparatus, an electronic device, and a machine readable medium, which belong to the field of touch technologies. The page browsing method includes: in a scenario of sliding for browsing a page, enabling browsing mode configuration according to a first touch operation received from a user; performing the browsing mode configuration in response to the user input; and automatically browsing consecutive pages according to a result of the browsing mode configuration.

16 Claims, 4 Drawing Sheets

(51) Int. Cl.
| | |
|---|---|
| *H04M 1/72448* | (2021.01) |
| *G06F 3/04847* | (2022.01) |
| *G06F 3/0481* | (2022.01) |
| *H04M 1/72445* | (2021.01) |
| *G06F 3/0482* | (2013.01) |
| *H04M 1/7243* | (2021.01) |
| *G06F 3/04883* | (2022.01) |

(52) U.S. Cl.
CPC ........ *G06F 3/0488* (2013.01); *G06F 3/04847* (2013.01); *G06F 3/04883* (2013.01); *H04M 1/7243* (2021.01); *H04M 1/72445* (2021.01); *H04M 1/72448* (2021.01); *G06F 2203/04808* (2013.01); *H04M 2250/22* (2013.01)

(58) Field of Classification Search
CPC .............. G06F 3/0481; G06F 3/04847; G06F 2203/04802; H04M 1/72445; H04M 1/72448; H04M 2250/22; H04M 1/7243
See application file for complete search history.

(56) References Cited

U.S. PATENT DOCUMENTS

| | | | | |
|---|---|---|---|---|
| 9,086,791 | B2* | 7/2015 | Ishak | G06F 3/0485 |
| 9,141,270 | B1* | 9/2015 | Stuart | G06F 3/0486 |
| 9,285,977 | B1* | 3/2016 | Greenberg | G06F 40/106 |
| 9,910,524 | B1* | 3/2018 | Wells | G06F 3/0412 |
| 10,203,868 | B2* | 2/2019 | Bauer | G06F 3/0416 |
| 10,311,066 | B1* | 6/2019 | Ko | G06F 40/14 |
| 10,346,021 | B2* | 7/2019 | Yamahara | G06F 3/0482 |
| 10,866,719 | B1* | 12/2020 | Bulusu | H04L 67/306 |
| 10,891,044 | B1* | 1/2021 | Corsin | G06F 3/04883 |
| 2004/0140984 | A1* | 7/2004 | Hinckley | G06F 3/03547 345/684 |
| 2006/0199616 | A1* | 9/2006 | Landschaft | G06F 3/0485 455/566 |
| 2007/0291009 | A1* | 12/2007 | Wright | G06F 3/0446 345/173 |
| 2008/0036743 | A1* | 2/2008 | Westerman | G06F 3/038 345/173 |
| 2008/0048997 | A1* | 2/2008 | Gillespie | G06K 9/00335 345/174 |
| 2008/0077492 | A1* | 3/2008 | Ho | G06Q 30/08 705/14.69 |
| 2008/0297485 | A1 | 12/2008 | Park | |
| 2010/0045705 | A1* | 2/2010 | Vertegaal | G06F 3/041 345/661 |
| 2010/0238115 | A1 | 9/2010 | Komaarashi et al. | |
| 2010/0309147 | A1* | 12/2010 | Fleizach | G06F 3/04842 345/173 |
| 2011/0035700 | A1* | 2/2011 | Meaney | G11B 27/034 715/784 |
| 2011/0074699 | A1* | 3/2011 | Marr | G06F 3/04817 345/173 |
| 2012/0010995 | A1* | 1/2012 | Skirpa | G06F 16/9577 705/14.49 |
| 2012/0066638 | A1* | 3/2012 | Ohri | G06F 3/0485 715/784 |
| 2012/0105367 | A1* | 5/2012 | Son | G06F 3/04883 345/174 |
| 2012/0127208 | A1 | 5/2012 | Jo et al. | |
| 2012/0159402 | A1* | 6/2012 | Nurmi | G06F 3/04883 715/863 |
| 2012/0192118 | A1* | 7/2012 | Migos | G06F 3/04883 715/863 |
| 2012/0313977 | A1* | 12/2012 | Kwon | G06F 3/0485 345/684 |
| 2013/0024364 | A1* | 1/2013 | Shrivastava | G06Q 20/38 705/39 |
| 2013/0219320 | A1* | 8/2013 | Seet | G06F 3/0483 715/776 |
| 2013/0262445 | A1* | 10/2013 | Corella | G06F 3/0481 707/722 |
| 2013/0346302 | A1* | 12/2013 | Purves | G06Q 20/108 705/40 |
| 2014/0013243 | A1* | 1/2014 | Flynn, III | G06F 16/447 715/753 |
| 2014/0026055 | A1* | 1/2014 | Cohn | G06F 3/04883 715/727 |
| 2014/0028554 | A1* | 1/2014 | De Los Reyes | G06F 3/04883 345/158 |
| 2014/0075394 | A1* | 3/2014 | Nawle | G06F 3/017 715/863 |
| 2014/0150026 | A1* | 5/2014 | Mountain | H04N 21/4821 725/52 |
| 2014/0191986 | A1* | 7/2014 | Kim | G06F 3/0488 345/173 |
| 2014/0245213 | A1* | 8/2014 | Gardenfors | H04L 51/066 715/778 |
| 2014/0250409 | A1* | 9/2014 | Shah | G06F 16/9577 715/790 |
| 2014/0282224 | A1* | 9/2014 | Pedley | G06F 3/0485 715/784 |
| 2015/0012426 | A1* | 1/2015 | Purves | G06Q 20/386 705/41 |
| 2015/0084874 | A1* | 3/2015 | Cheng | G06F 3/04883 345/173 |
| 2015/0169161 | A1 | 6/2015 | Moon | |
| 2015/0339002 | A1* | 11/2015 | Arnold | G06F 3/04883 715/854 |
| 2016/0100036 | A1* | 4/2016 | Lo | H04L 67/08 709/203 |
| 2016/0216862 | A1* | 7/2016 | Turner | G06Q 10/107 |
| 2016/0328108 | A1* | 11/2016 | Li | G06F 3/0485 |
| 2016/0357382 | A1* | 12/2016 | Metz | G06F 3/04883 |
| 2017/0038856 | A1* | 2/2017 | Missig | G06F 8/34 |
| 2017/0115867 | A1 | 4/2017 | Bargmann | |
| 2017/0357398 | A1* | 12/2017 | Alonso-Ruiz | G06F 3/04883 |
| 2018/0024716 | A1* | 1/2018 | Kim | G06F 3/0485 715/745 |
| 2018/0121083 | A1* | 5/2018 | Jiao | G06F 3/011 |
| 2018/0267682 | A1* | 9/2018 | Yu | G06F 3/04883 |
| 2020/0174643 | A1* | 6/2020 | Ratering | G01N 29/0609 |

FOREIGN PATENT DOCUMENTS

| | | |
|---|---|---|
| CN | 102591565 A | 7/2012 |
| CN | 103970431 A | 8/2014 |
| CN | 104636048 A | 5/2015 |
| CN | 105607857 A | 5/2016 |
| CN | 105677164 A | 6/2016 |
| CN | 105745614 A | 7/2016 |
| CN | 105892872 A | 8/2016 |
| JP | 2005-308411 A | 11/2005 |
| JP | 2010-224684 A | 10/2010 |
| JP | 2012-113694 A | 6/2012 |
| JP | 2013-3718 A | 1/2013 |
| JP | 2017-146803 A | 8/2017 |
| JP | 2017-151899 A | 8/2017 |
| KR | 10-2012-0054925 A | 5/2012 |
| TW | 201035804 A1 | 10/2010 |

OTHER PUBLICATIONS

Disclosed anonymously, "A method to automate pagination and navigation accessibility", in IP.com Prior Art Database Technical Disclosure, pp. 1-7, Jun. 15, 2015 (Year: 2015).*
Disclosed Anonymously, "A method of screen moving direction control in mobile device based on user stay time", in IP.com Prior Art Database Technical Disclosure, pp. 1-12, Jan. 23, 2013 (Year: 2013).*
Office Action and Search Report dated Jan. 10, 2020 issued in corresponding Chinese Application No. 201710889357.3.
Reasons for Refusal dated Nov. 11, 2020 issued in corresponding Japanese Application No. 2019-568164.
International Search Report dated Jun. 12, 2018 issued in corresponding International Application No. PCT/CN2017/119461.
Office Action dated Jun. 14, 2019 issued in corresponding Chinese Application No. 201710889357.3.

(56) References Cited

OTHER PUBLICATIONS

Extended Search Report dated Mar. 3, 2021 issued in corresponding European Application No. 17927773.6.
Second Office Action dated Mar. 23, 2021 issued in corresponding Japanese Application No. 2019-568164.

* cited by examiner

PAGE BROWSING

CROSS REFERENCE TO RELATED APPLICATIONS

This application is a U.S. Bypass Continuation of International Application No. PCT/CN2017/119461 filed on Dec. 28, 2017. This international application claims priority to Chinese Patent Application No. 201710889357.3, entitled "METHOD, APPARATUS, AND ELECTRONIC DEVICE FOR BROWSING CONSECUTIVE PAGES" filed on Sep. 27, 2017, which is incorporated by reference herein in its entirety.

TECHNICAL FIELD

The present disclosure generally relates to the field of touch technologies.

BACKGROUND

When people browse news and social applications on their mobile phones, they usually just want to browse the summary and don't want to know the details. However, because a limited amount of content the touch screen of the mobile phone may be displayed in a single time, a user needs to constantly use a finger to flip a page by swiping upward or swiping downward on a touch screen to load more content while browsing.

Therefore, according to the technical solution in the prior art, consecutive pages cannot be automatically browsed, and a manual operation is required to slide the page, which still needs to be improved.

The foregoing information disclosed in the background is only used to enhance understanding of the background of the present disclosure, and therefore the information may include information that does not constitute the prior art known to those of ordinary skill in the art.

SUMMARY

The present disclosure provides a page browsing method, apparatus, electronic device, and a machine readable medium, to resolve the foregoing technical problems.

Other features and advantages of the present disclosure will be apparent from the following detailed description, or partially acquired through practice of the present disclosure.

According to an aspect of the present disclosure, a page browsing method is provided, including:

in a scenario of sliding for browsing a page, enabling browsing mode configuration according to a first touch operation received from a user;

performing the browsing mode configuration in response to the user input; and automatically browsing consecutive pages according to a result of the browsing mode configuration.

In one embodiment of the present disclosure, the performing the browsing mode configuration in response to the user input includes:

obtaining a direction and a speed of a sliding operation by the user on a touch screen;

obtaining the result of the browsing mode configuration according to the direction and the speed of the sliding operation; and ending the browsing mode configuration in response to a second touch operation by the user.

In one embodiment of the present disclosure, the performing the browsing mode configuration in response to the user input includes:

presenting one or more options for the user to select, the one or more options being configured to indicate different modes of automatically sliding for browsing;

ending the browsing mode configuration according to an operation of selecting one of the options by the user; and determining, as the result of the browsing mode configuration, an option selected by the user.

In one embodiment of the present disclosure, the method further includes: stopping automatic browsing of the consecutive pages when it is detected that the browsing has reached the end of the consecutive pages.

In one embodiment of the present disclosure, the method further includes: stopping automatic browsing of the consecutive pages when a third touch operation by the user is detected.

In one embodiment of the present disclosure, the first touch operation is used as an operation performed by the user on a configuration enabling response area in the scenario of sliding for browsing the page.

In one embodiment of the present disclosure, the enabling the browsing mode configuration includes:

entering a configuration page, the configuration page being in a translucent state.

In one embodiment of the present disclosure, the method is applicable to a 3D touch screen.

In one embodiment of the present disclosure, the first touch operation is a tapping operation in a 3D touch operation.

In one embodiment of the present disclosure, the second touch operation is a touch-and-hold operation in a 3D touch operation.

In one embodiment of the present disclosure, the third touch operation is a clicking operation in a 3D touch operation.

According to still another aspect of the present disclosure, an electronic device is provided, including: a processor; a non-transitory storage medium storing a machine executable instruction, where the processor is caused, by reading and executing the machine executable instruction, to perform the foregoing method.

According to another aspect of the present disclosure, a machine readable medium is provided, on which a machine executable instruction is stored, the machine executable instruction being configured to implement the foregoing method when executed by a processor.

According to the page browsing method and apparatus, the electronic device, and the machine readable medium provided in the embodiments of the present disclosure, in the scenario of sliding for browsing the page, the consecutive page configuration is browsed in response to the user input, and then the consecutive pages are automatically browsed according to the result of the configuration, that is, consecutive pages are automatically loaded without needing constant manual touch operations, thereby improving an experience of user interaction. In addition, the configuration of browsing consecutive pages can be implemented only relying on the 3D Touch technology built in the mobile phone, and no extra icons are added on the interface, so that interface space is saved.

It should be understood that the above general descriptions and the following detailed descriptions are merely exemplary, and cannot limit the present disclosure.

BRIEF DESCRIPTION OF THE DRAWINGS

The above and other objectives, features, and advantages of the present disclosure will become more apparent from the detailed description of exemplary embodiments of the present disclosure with reference to the accompanying drawings.

DETAILED DESCRIPTION OF THE EMBODIMENTS

The examples of implementations are described comprehensively with reference to the accompanying drawings. However, the examples of implementations may be implemented in multiple forms, and it should not be understood as being limited to the examples of examples described herein. Conversely, the implementations are provided to make the present disclosure more comprehensive and complete, and comprehensively convey the idea of the examples of the implementations to a person skilled in the art. The accompanying drawings are merely exemplary illustrations of the present disclosure and are not necessarily drawn to scale. A same reference numeral in the accompanying drawings represents same or similar components, and therefore repeated descriptions of the components or units are omitted.

In addition, the described features, structures, or characteristics may be combined in one or more implementations in any appropriate manner. In the following descriptions, a lot of specific details are provided to give a comprehensive understanding of the implementations of the present disclosure. However, a person skilled in the art should be aware that, the technical solutions in the present disclosure may be implemented without one or more of the particular details, or another method, component, device, or step may be used. In other cases, known structures, methods, apparatuses, implementations, materials, or operations are not shown or described in detail to avoid obscuring aspects of the present disclosure.

Some block diagrams shown in the accompany drawings are functional entities and do not necessarily correspond to physically or logically independent entities. Such functional entities may be implemented in the form of software, or implemented in one or more hardware modules or integrated circuits, or implemented in different networks and/or processor apparatuses and/or microcontroller apparatuses.

In order to make the objectives, technical solutions, and advantages of the present disclosure more comprehensible, the present disclosure is described in further detail below with reference to specific embodiments and the accompanying drawings.

In a related embodiment, a hovering button may be added on a browsed page, the hovering button includes an upper sliding button and a lower sliding button, and a long press of the upper sliding button or the lower sliding button for swiping upward or downward the page to automatically browse the consecutive pages. Buttons in up, down, left, and right directions may be set to automatically browse the consecutive pages in different directions, but a window needs to be added in the interface to set the hovering button, which occupies interface space, has certain limitation, can only be limited to a certain application. Alternatively, a third-party tool (such as adding an external mouse or an external touchpad) is required to achieve automatic page loading, but a disadvantage is that there is no additional device and portability is poor.

It may be learned that sliding for browsing consecutive pages in the related embodiment requires manual operations, even if a finger does not slide directly on the page, a manual operation is required, and automatic browsing of the consecutive pages is not implemented without the manual operation.

Based on the above, in the present disclosure, the browsing mode configuration is performed based on the 3D touch technology. The 3D Touch technology is adding two press detection methods of Peek (tap) and Pop (touch and hold) in vertical directions based on the original tapping operation from a physical level, so that an operation performed on the touch screen is changed from the "tapping" to three operations of the "tapping", "light pressing", and "touching and holding", to achieve the purpose of stereoscopic touch, thereby achieving the goal in fewer steps, so that interaction is faster and more convenient.

Figure 1:
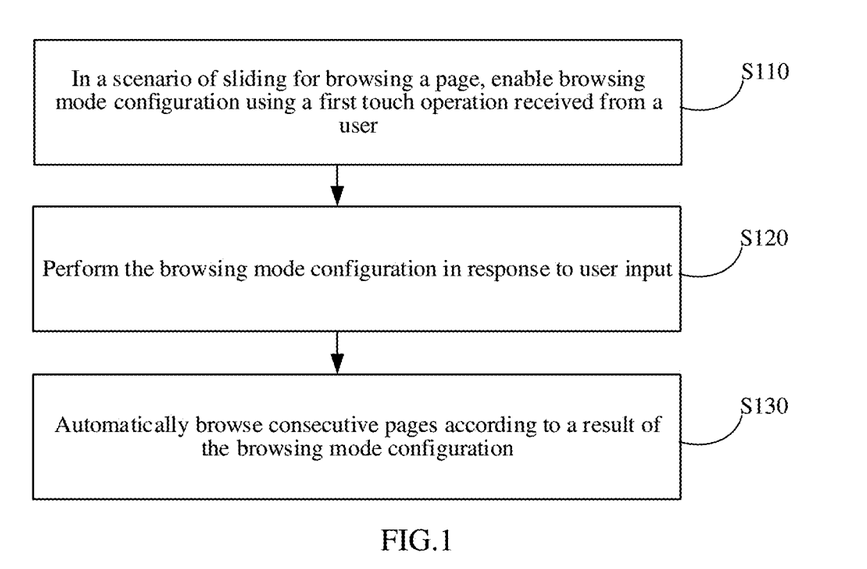
FIG. 1 is a flowchart of a page browsing method according to an embodiment of the present disclosure.

FIG. 1 is a flowchart of a method for browsing consecutive pages according to an embodiment of the present disclosure. The method may be applied to a 3D touch screen, and include the following steps.

As shown in FIG. 1, in step S110, in a scenario of sliding for browsing a page, browsing mode configuration may be enabled according to a first touch operation received from a user.

As shown in FIG. 1, in step S120, browsing mode configuration may be performed in response to the user input.

As shown in FIG. 1, in step S130, consecutive pages may be automatically browsed according to a result of the browsing mode configuration.

In this embodiment, the scenario of sliding for browsing a page may include, but is not limited to, scenarios that need to be continuously loaded in a WeChat Moments, TouTiao news, and the like. Correspondingly, the consecutive pages may include a page of Moments, or news pages of TouTiao, or other pages that cannot be completely displayed on the screen of the mobile phone and that need to be swiped to display the remaining content.

Figure 2:
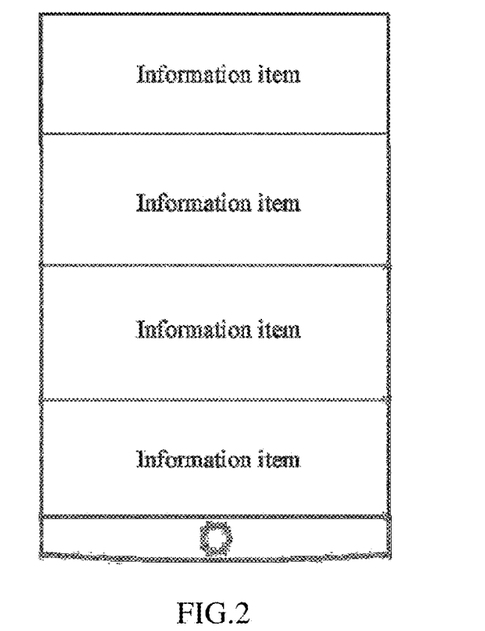
FIG. 2 is a schematic diagram of a scenario of sliding for browsing a page according to an embodiment of the present disclosure.

FIG. 2 is a schematic diagram of a scenario of sliding for browsing a page in this embodiment, including a plurality of information items that may be continuously loaded. According to the description of the foregoing related embodiments, a manual operation is required, that is, swiping up or down the page to implement continuous loading of the page. In the scenario shown in FIG. 2 in this embodiment, a browsing mode may be configured. Once the configuration is completed, the page can be automatically slid without needing manual intervention in the automatic sliding process, and consecutive pages may be automatically browsed depending on a direction and a speed of the configuration.

In this embodiment, in step S110, a first touch operation is performed in a "configuration enabling response area" in the scenario of sliding for browsing a page, so that browsing mode configuration may be enabled, to enter the configuration page, and the configuration page is in a translucent state. The "configuration enabling response area" is used as a response area for enabling the browsing mode configuration, which may be a non-image area such as a text area or a blank area. Because an operation of tapping an image on a mobile terminal device such as a mobile phone is usually opening an image by default, that is, the image is displayed on an interface in a large image mode. Therefore, in order to avoid conflict with the user's existing operating habits, the browsing mode configuration is enabled according to a first trigger operation in the non-image area. In this embodiment, the first touch operation may be a tap operation in a 3D touch operation.

It should be noted that there may be a plurality of ways to perform the browsing mode configuration in response to the user input in step S120. The following embodiments are respectively given in this embodiment for description.

Figure 3:
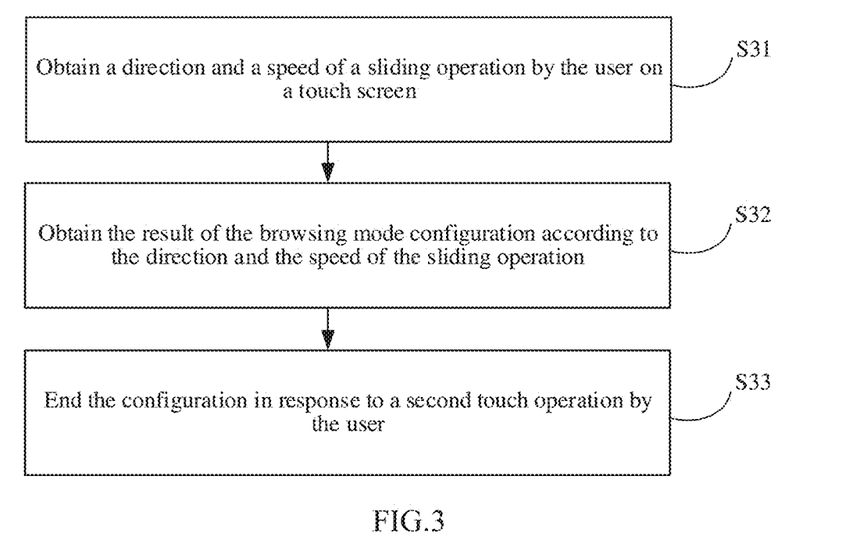
FIG. 3 is a flowchart of step S120 according to an embodiment of the present disclosure.

FIG. 3 is a flowchart of step S120 in this embodiment, including the following steps.

As shown in FIG. 3, in step S31, a direction and a speed of a sliding operation by the user on a touch screen may be obtained.

As shown in FIG. 3, in step S32, the result of the browsing mode configuration is obtained according to the direction and the speed of the sliding operation. In this embodiment, the result of the browsing mode configuration includes the direction and the speed of automatically browsing the consecutive pages.

As shown in FIG. 3, in step S33, configuration may end in response to a second touch operation by the user. In this embodiment, the second touch operation may be a touch-and-hold operation in a 3D touch operation.

The direction and the speed of sliding by the user's finger are detected using the touch screen, and are used as the result of the browsing mode configuration, that is, the detected direction in which the finger slides is the direction in which the consecutive pages are automatically browsed, and the detected speed at which the finger slides is the speed at which the consecutive pages are automatically browsed. In this way, after the configuration, the automatic browsing of the consecutive pages according to the configured direction and the speed can completely simulate the operation of manually sliding the page, so as to achieve an effect that is of automatically browsing the consecutive pages and that meets expectations of the user.

It should be noted that the steps in this embodiment are only for convenience of describing the implementation process, and do not indicate that a sequence in which the steps are performed is limited. For example, in step S31, the direction and the speed of sliding by the user's finger on the touch screen are obtained, to obtain the result of the browsing mode configuration in step S32.

Figure 4:
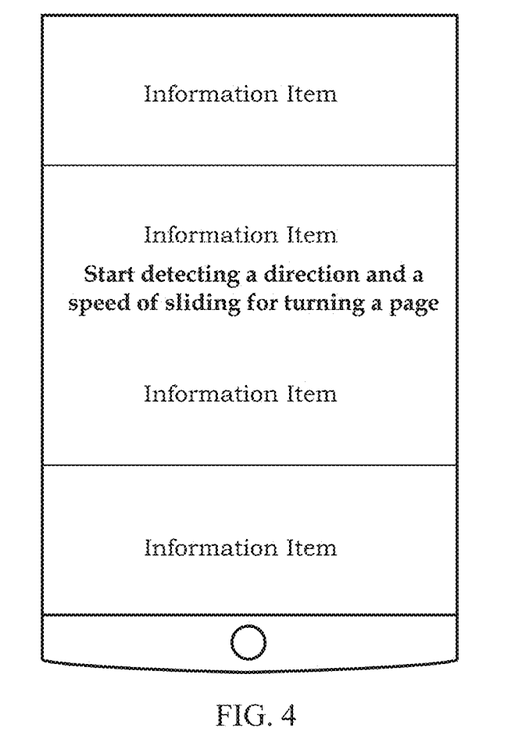
FIG. 4 is a schematic diagram of a configuration page according to an embodiment of the present disclosure.

FIG. 4 is a schematic diagram of a configuration page in Embodiment 1. After the browsing mode configuration is enabled in step S110, the configuration page in FIG. 4 is formed. As shown in FIG. 4, the configuration page is in a translucent state, that is, a page displayed with "start detecting the direction and the speed of the sliding for turning a page" is added to the page shown in FIG. 2 to prompt the user to slide the finger on the touch screen for configuration. After the result of the browsing mode configuration is obtained through obtaining the direction and the speed of sliding by the user's finger, the 3D Touch touch-and-hold operation is used to complete the configuration.

Afterwards, in the page shown in FIG. 2, the consecutive pages start to be automatically browsed according to the direction and the speed of the configured browsing mode to load more information items, and the user can browse without manual intervention. Automatically browsing consecutive pages is stopped when it is detected that the end of consecutive pages has been reached, or automatically browsing consecutive pages is manually stopped when a third touch operation is detected. In this embodiment, the third touch operation may be a tap operation in a 3D touch operation.

Based on the flowchart of FIG. 3 and the schematic diagram shown in FIG. 4, in this embodiment, a user-defined mode is used to configure the direction and the speed of automatically browsing the consecutive pages, and the consecutive pages are automatically browsed according to the configuration result, so that automatic browsing can be implemented to provide users with a good interactive experience.

Based on the above, in an example, in the scenario of sliding for browsing the page, the browsing mode configuration may be performed based on 3D Touch and user-defined input, and then the consecutive pages are automatically browsed according to the result of the configuration, that is, consecutive pages are automatically loaded without needing constant manual touch operations, thereby improving an experience of user interaction. In addition, the configuration of the browsing mode can be implemented only relying on the 3D Touch technology built in the mobile phone, and no extra icons are added on the interface, so that interface space is saved. Moreover, the method can be implemented only relying on the 3D Touch built in the mobile phone without depending on any third-party tool for support, which is simple and convenient to use.

Figure 5:
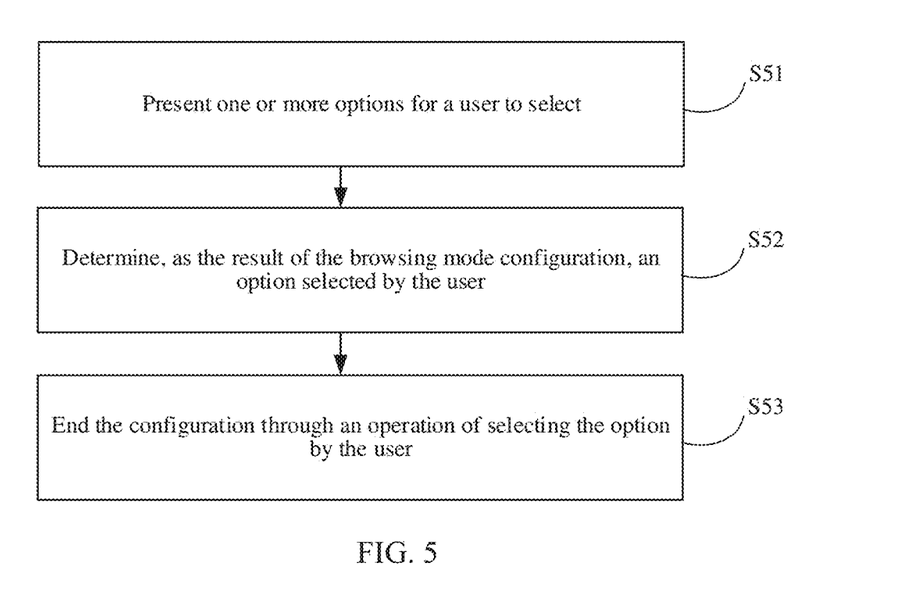
FIG. 5 is a flowchart of step S120 according to an embodiment of the present disclosure.

In still another example, FIG. 5 is a flowchart of step S120 in this embodiment, including the following steps.

As shown in FIG. 5, in step S51, one or more options for a user to select are presented, the one or more options being configured to indicate different modes of automatically sliding for browsing, for example, including fast swiping upward, uniformly swiping upward, uniformly swiping downward, and fast swiping downward. It should be noted that, in this embodiment, only four commonly used automatic modes of sliding for browsing are used as an example. In addition to the four modes of automatically browsing consecutive pages in an actual application, more types of options may be provided according to user requirements, for example, swiping upward at a slow speed, swiping downward at a slow speed, or the like, which is not specifically limited in the present disclosure.

As shown in FIG. 5, in step S52, an option selected by the user may be determined as the result of the browsing mode configuration. The result of the browsing mode configuration includes the direction and the speed of automatically browsing the consecutive pages.

In this embodiment, it may be learned from an option selected by the user from the several options provided in the foregoing step S31, that the mode of browsing desired by the user includes the direction and the speed of automatically browsing the consecutive pages, that is, the direction indicating swiping upward or swiping downward, the speed indicating fast swiping, swiping at a uniform speed or at a slow speed, to achieve the effect that is of automatically browsing the consecutive pages and that meets expectations of the user.

As shown in FIG. 5, in step S53, the configuration is completed according to an operation of selecting any option by the user. In step S52, the user's finger completes the selection operation of the option by clicking a corresponding option, to end the configuration.

It should be noted that the steps in this embodiment are only for convenience of describing the implementation process, and do not indicate that a sequence in which the steps are performed is limited. For example, in the foregoing step S53, the option selected by the user is obtained using the user's finger to click on a button of any of a plurality of options are obtained, to obtain the result of the browsing mode configuration in step S52, and then the configuration ends.

Figure 6:
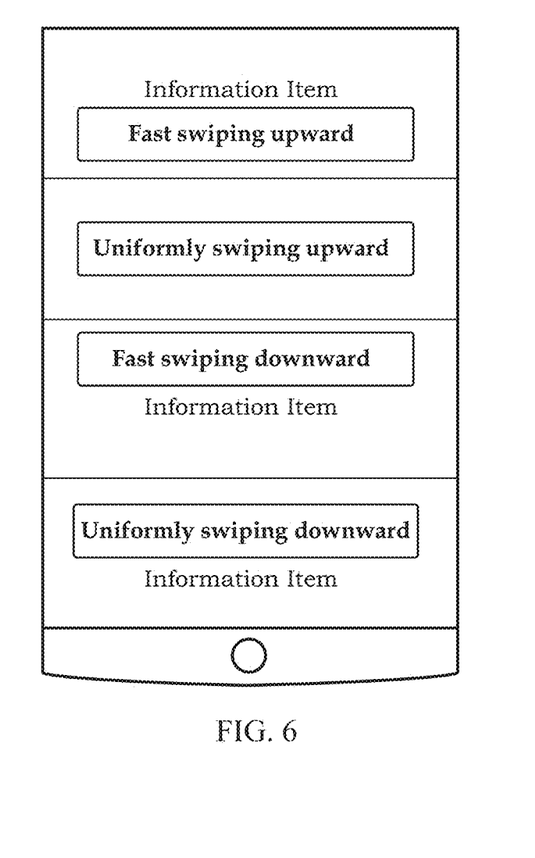
FIG. 6 is a schematic diagram of a configuration page according to an embodiment of the present disclosure.

FIG. 6 is a schematic diagram of a configuration page. After the configuration of browsing consecutive pages is enabled in step S110, the configuration page in FIG. 6 is formed. As shown in FIG. 6, the configuration page is in a translucent state, that is, a page displayed with a plurality of options is added to the page shown in FIG. 2. Four modes of automatically browsing consecutive pages of fast swiping upward, uniformly swiping upward, uniformly swiping downward, and fast swiping downward are used as an example. FIG. 6 shows four options of "fast swiping upward", "uniformly swiping upward", "uniformly swiping downward", and "fast swiping downward". The user moves the finger to any of the options and selects the option, the selection is completed and the configuration is completed without requiring the 3D Touch touch-and-hold operation.

After that, in the page shown in FIG. 2, the consecutive pages start to be automatically browsed according to the direction and the speed of automatically browsing the consecutive pages in the configuration to load more information items, and the user can browse without manual intervention. Automatically browsing consecutive pages is stopped when it is detected that the end of consecutive pages has been reached, or automatically browsing consecutive pages is manually stopped when a third touch operation is detected. In this embodiment, the third touch operation may be a tap operation in a 3D touch operation.

Based on the flowchart of FIG. 5 and the schematic diagram shown in FIG. 6, in this embodiment, an option mode may be used to configure the direction and the speed of automatically browsing the consecutive pages, and the consecutive pages are automatically browsed according to the configuration result, so that automatic browsing can be implemented to provide users with a good interactive experience.

Based on the above, the browsing mode configuration in the scenario of sliding for browsing the page may be performed based on 3D Touch and the option selected by the user, and then the consecutive pages are automatically browsed according to the result of the configuration, that is, consecutive pages are automatically loaded without needing constant manual touch operations, thereby improving an experience of user interaction. In addition, the configuration of the browsing mode can be implemented only relying on the 3D Touch technology built in the mobile phone, and no extra icons are added on the interface, so that interface space is saved. Moreover, the method can be implemented only relying on the 3D Touch built in the mobile phone without depending on any third-party tool for support, which is simple and convenient to use.

Based on the foregoing embodiments and as shown in FIG. 3 to FIG. 6, the present disclosure provides a mode of performing browsing mode configuration via customization and the option mode. Definitely, in other embodiments of the present disclosure, a more diversified configuration mode may further be used to complete the configuration of automatically browsing the consecutive pages in the direction and the speed. For example, the direction of automatically sliding for browsing is set to be constantly upward or downward by default, and a speed of browsing is selected through a slider to achieve configuration of the direction and the speed for browsing. There are many similar ways, which are not listed one by one. The configuration methods that are of automatically browsing consecutive pages based on the 3D Touch technology and that can be thought of by those skilled in the art fall within the protection scope of the method provided by the present disclosure.

According to another aspect, the present disclosure further provides an electronic device including a processor and a storage medium storing an operation instruction for the processor to control the following method:

enabling, according to a first touch operation, browsing mode configuration in a scenario of sliding for browsing a page to enter a configuration page; performing the browsing mode configuration in response to user input in the configuration page; and automatically browsing, according to a result of the browsing mode configuration, consecutive pages in the scenario of sliding for browsing a page.

Figure 7:
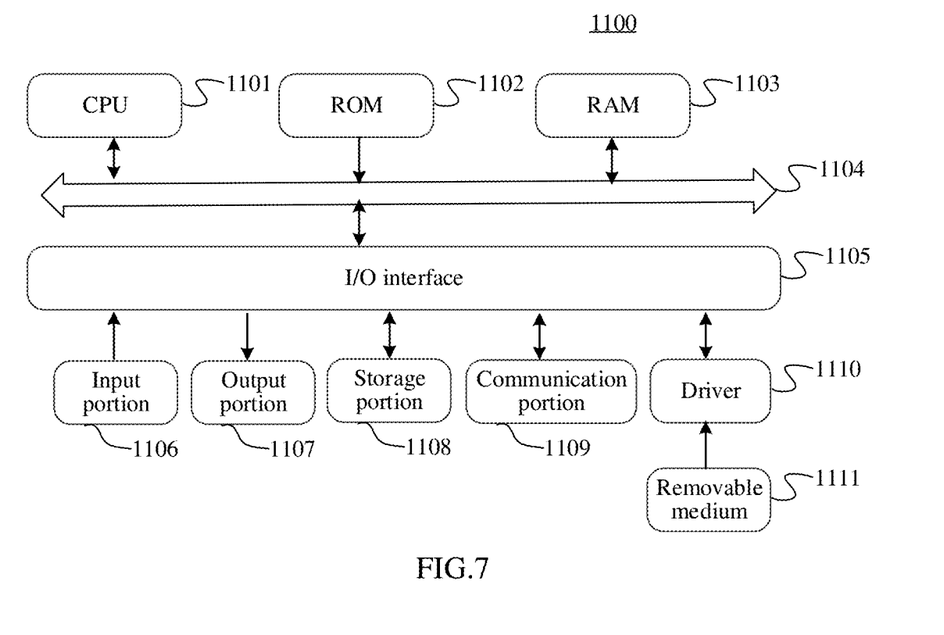
FIG. 7 is a schematic structural diagram of an electronic device to which a page browsing method is applicable according to yet another embodiment of the present disclosure.

FIG. 7 is a schematic structural diagram of an electronic device 1100 to which the foregoing page browsing method is applicable. The electronic device shown in FIG. 7 is only an example, and should not impose any limitation on the functions and the scope of use of the embodiments of the present disclosure.

As shown in FIG. 7, the electronic device 1100 includes a central processing unit (CPU) 1101. It can perform various proper actions and processing based on a program stored in a read-only memory (ROM) 1102 or a program loaded from a storage part 1107 into a random access memory (RAM) 1103. The RAM 1103 also stores various programs and data required to operate the electronic device 1100. The CPU 1101, the ROM 1102, and the RAM 1103 are connected to each other through a bus 1104. An input/output (I/O) interface 1105 is also connected to the bus 1104.

The following parts are connected to the I/O interface 1105: an input part 1106 including a keyboard, a mouse, or the like; an output part 1107 including a cathode ray tube (CRT), a liquid crystal display (LCD), a speaker, or the like; a storage part 1108 including a hard disk; and a communication part 1109 including a network interface card such as a LAN card or a modem. The communication part 1109 performs communication processing by using a network such as the Internet. A driver 1110 is also connected to the I/O interface 1105 as required. A removable medium 1111 such as a magnetic disk, an optical disc, a magneto-optical disk, or a semiconductor memory is mounted on the driver 1110 as required, so that a computer program read from the removable medium 1111 is installed into the storage part 1108 as required.

Particularly, according to an embodiment of this disclosure, the processes described in the foregoing by referring to the flowcharts may be implemented as computer software programs. For example, an embodiment of the present disclosure includes a computer program product, and the computer program product includes a computer program stored in a computer readable medium. The computer program includes program code used for performing the methods shown in the flowcharts. In such an embodiment, by using the communication part 1109, the computer program may be downloaded and installed from a network, and/or installed from the removable medium 1111. When the computer program is executed by a CPU 1101, the foregoing functions defined in the system of the present application are executed.

It should be noted that the machine readable medium in the present disclosure may be a machine readable signal medium or a machine readable storage medium or any combination thereof. The machine readable medium may be, for example, but not limited to, an electric, magnetic, optical, electromagnetic, infrared, or semi-conductive system, apparatus, or device, or any combination thereof. More specific examples of the machine readable medium may include but are not limited to: an electrical connection having one or more wires, a portable computer magnetic disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination thereof. In the present disclosure, the machine readable medium may be any tangible medium including or storing a program, and the program may be used by or in combination with an instruction execution system, apparatus, or device. In the present disclosure, the machine readable signal medium may include a data signal transmitted in a baseband or as part of a carrier, and stores computer readable program code. The propagated data signal may be in a plurality of forms, including, but not limited to, an electromagnetic signal, an optical signal, or any appropriate combination thereof. The machine readable signal medium may alternatively be any machine readable medium other than the computer readable medium. The machine readable medium may be configured to send, propagate, or transmit a program configured to be used by or in combination with an instruction execution system, apparatus, or device. The instruction code included in the machine readable medium may be transmitted by using any suitable medium, including but not limited to, via wireless transmission, a wire, a cable, radio frequency (RF) or the like, or any suitable combination of thereof.

The flowcharts and block diagrams in the accompanying drawings show architectures, functions, and operations that may be implemented for the system, the method, and the computer program product according to the embodiments of the present disclosure. In this regard, each box in a flowchart or a block diagram may represent a module, a program segment, or a part of code. The module, the program segment, or the part of code includes one or more executable instructions used for implementing specified logic functions. It should also be noted that, in some implementations used as substitutes, functions annotated in boxes may alternatively be occur in a sequence different from that annotated in an accompanying drawing. For example, actually two boxes shown in succession may be performed basically in parallel, and sometimes the two boxes may be performed in a reverse sequence. This is determined by a related function. It should also be noted that, each box in a block diagram or a flowchart and a combination of boxes in the block diagram or the flowchart may be implemented by using a dedicated hardware-based system configured to perform a specified function or operation, or may be implemented by using a combination of dedicated hardware and a machine instruction.

A related unit described in the embodiments of the present disclosure may be implemented in a software manner, or may be implemented in a hardware manner. The units described may alternatively be disposed in a processor, for example, as in the following description: a processor including a sending unit, an obtaining unit, a determining unit, and a first processing unit. In some cases, names of these units do not constitute a limitation on the units. For example, the sending unit may also be described as "a unit configured to send an image acquisition request to a connected server".

According to another aspect, the present disclosure further provides a machine readable medium. The machine readable medium may be included in the device described in the foregoing embodiments, or may exist alone and is not disposed in the device. The machine readable medium carries machine readable instructions. When executed by a device, the machine readable instructions cause the device to perform the following method steps:

in a scenario of sliding for browsing a page, enabling browsing mode configuration according to a first touch operation received from a user; performing the browsing mode configuration in response to the user input; and automatically browsing consecutive pages according to a result of the browsing mode configuration.

It should be clearly understood that the present disclosure describes how to make and use specific examples, but the principles of the present disclosure are not limited to any details of these examples. On the contrary, these principles can be applied to many other implementations based on the teachings of the content disclosed in the present disclosure.

The exemplary implementations of the present disclosure have been specifically shown and described above. It should be understood that the present disclosure is not limited to the detailed structures, configurations or implementation methods described herein. On the contrary, the present disclosure is intended to cover various modifications and equivalent configurations within the spirit and scope of the appended claims.

The invention claimed is:

1. A page browsing method, comprising:
in a scenario of sliding for browsing a page, enabling a browsing mode configuration according to a first touch operation received from a user, wherein the first touch operation is performed by the user, in the scenario of sliding for browsing the page, on a configuration enabling response area, the configuration response area being a blank area;
performing the browsing mode configuration in response to the user input, wherein the browsing mode configuration is performed in a configuration page that is newly generated and presented to the user when the browsing mode configuration is enabled, and wherein the step of performing the browsing mode configuration in response to the user input comprises:
obtaining a direction and a speed of a sliding operation performed by the user on a touch screen; and
ending the browsing mode configuration in response to a second touch operation by the user; and
automatically browsing consecutive pages according to a result of the browsing mode configuration, wherein the result of the browsing mode configuration comprises a direction and a speed of the automatic browsing of the consecutive pages which are equal to the direction of the sliding operation and the speed of the sliding operation, respectively.

2. The method according to claim 1, wherein the performing the browsing mode configuration in response to the user input comprises:
presenting one or more options for the user to select, the one or more options being configured to indicate different modes of automatically sliding for browsing;
ending the browsing mode configuration according to an operation of selecting one of the options by the user; and
determining, as the result of the browsing mode configuration, an option selected by the user.

3. The method according to claim 1, further comprising:
stopping automatic browsing of the consecutive pages when it is detected that the browsing has reached the end of the consecutive pages.

4. The method according to claim 1, further comprising:
stopping automatic browsing of the consecutive pages when a third touch operation by the user is detected.

5. The method according to claim 1, wherein the configuration page is in a translucent state.

6. The method according to claim 1, wherein the page browsing method is applicable to a 3D touch screen.

7. The method according to claim 1, wherein the first touch operation is a tapping operation in a 3D touch operation.

8. The method according to claim 1, wherein the second touch operation is a touch-and-hold operation in a 3D touch operation.

9. The method according to claim 4, wherein the third touch operation is a clicking operation in a 3D touch operation.

10. An electronic device, comprising:
a processor; and
a non-transitory storage medium storing a machine executable instruction executable by the processor, wherein the processor is caused, by reading and executing the machine executable instruction, to perform the following operations:
in a scenario of sliding for browsing a page, enabling a browsing mode configuration according to a first touch operation received from a user, wherein the first touch operation is performed by the user, in the scenario of sliding for browsing the page, on a configuration enabling response area, the configuration response area being a blank area;
performing the browsing mode configuration in response to user input, wherein the browsing mode configuration is performed in a configuration page that is newly generated and presented to the user when the browsing mode configuration is enabled, and wherein the step of performing the browsing mode configuration in response to the user input comprises:
obtaining a direction and a speed of a sliding operation performed by the user on a touch screen; and
ending the browsing mode configuration in response to a second touch operation by the user; and
automatically browsing consecutive pages according to a result of the browsing mode configuration, wherein the result of the browsing mode configuration comprises a direction and a speed of the automatic browsing of the consecutive pages which are equal to the direction of the sliding operation and the speed of the sliding operation, respectively.

11. The electronic device according to claim 10, wherein the performing the browsing mode configuration in response to user input comprises:
presenting one or more options for the user to select, the one or more options being configured to indicate different modes of automatically sliding for browsing;
ending the browsing mode configuration according to an operation of selecting one of the options by the user; and
determining, as the result of the browsing mode configuration, an option selected by the user.

12. The electronic device according to claim 10, further comprising:
stopping automatic browsing of the consecutive pages when it is detected that the browsing has reached the end of the consecutive pages.

13. The electronic device according to claim 10, further comprising:
stopping automatic browsing of the consecutive pages when a third touch operation from the user is detected.

14. The electronic device according to claim 10, wherein the configuration page is in a translucent state.

15. The electronic device according to claim 10, wherein the page browsing method is applicable to a 3D touch screen.

16. A non-transitory machine readable storage medium on which a machine executable instruction is stored, wherein the machine executable instruction is configured to implement the following operations:
in a scenario of sliding for browsing a page, enabling a browsing mode configuration according to a first touch operation received from a user, wherein the first touch operation is performed by the user, in the scenario of sliding for browsing the page, on a configuration enabling response area, the configuration response area being a blank area;
performing the browsing mode configuration in response to user input, wherein the browsing mode configuration is performed in a configuration page that is newly generated and presented to the user when the browsing mode configuration is enabled, and wherein the step of performing the browsing mode configuration in response to the user input comprises:
obtaining a direction and a speed of a sliding operation performed by the user on a touch screen; and
ending the browsing mode configuration in response to a second touch operation by the user; and
automatically browsing consecutive pages according to a result of the browsing mode configuration, wherein the result of the browsing mode configuration comprises a direction and a speed of the automatic browsing of the consecutive pages which are equal to the direction of the sliding operation and the speed of the sliding operation, respectively.

* * * * *